US008085347B2

(12) United States Patent
Yoshikawa et al.

(10) Patent No.: US 8,085,347 B2
(45) Date of Patent: Dec. 27, 2011

(54) IMAGE FORMING APPARATUS AND CONTROL METHOD THEREOF

(75) Inventors: Junichi Yoshikawa, Tokyo (JP); Kosuke Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 988 days.

(21) Appl. No.: 12/063,741

(22) PCT Filed: Aug. 10, 2006

(86) PCT No.: PCT/JP2006/315833
§ 371 (c)(1), (2), (4) Date: Feb. 13, 2008

(87) PCT Pub. No.: WO2007/020869
PCT Pub. Date: Feb. 22, 2007

(65) Prior Publication Data

US 2009/0109466 A1 Apr. 30, 2009

(30) Foreign Application Priority Data

Aug. 16, 2005 (JP) ................................ 2005-236003

(51) Int. Cl.
*H04N 7/00* (2011.01)

(52) U.S. Cl. ........ 348/460; 348/552; 348/553; 348/559; 358/1.9; 358/1.13; 358/1.15

(58) Field of Classification Search ........................ None
See application file for complete search history.

(56) References Cited

U.S. PATENT DOCUMENTS 5,070,404 A * 12/1991 Bullock et al. ................ 348/460
5,077,607 A * 12/1991 Johnson et al. ................. 725/74
5,128,752 A * 7/1992 Von Kohorn ................. 705/7.29
5,285,278 A * 2/1994 Holman .......................... 725/23
5,500,681 A * 3/1996 Jones ............................ 348/473
5,604,542 A * 2/1997 Dedrick ........................ 348/552
5,786,864 A 7/1998 Yamamoto .................... 348/473
6,774,951 B2 8/2004 Narushima
7,171,442 B1 * 1/2007 Huang .......................... 709/203
7,610,609 B2 10/2009 Shibamiya
2002/0060748 A1 * 5/2002 Aratani et al. ................ 348/552
(Continued)

FOREIGN PATENT DOCUMENTS

EP 783229 A1 * 7/1997
(Continued)

OTHER PUBLICATIONS

Translation of International Preliminary Report on Patentability in PCT/JP2006/315833.

(Continued)

*Primary Examiner* — Kristine Kincaid
*Assistant Examiner* — Oschta Montoya
(74) *Attorney, Agent, or Firm* — Fitzpatrick, Cella, Harper & Scinto

(57) ABSTRACT

A technology is provided that suppresses a noise that an image forming apparatus makes in the course of an operation thereof from interfering with a user who is watching television. When a printer 203 receives a print command, the printer 203 performs a print job as per a normal mode if a commercial is being displayed on a digital TV 201. If what is being displayed on the digital TV 201 is not the commercial, the printer 203 suspends the print job until the commercial begins to be displayed.

11 Claims, 13 Drawing Sheets

| |  DIGITAL TV | PRINTER  |
|---|---|---|
| FIRST EMBODIMENT | WHEN COMMERCIAL IS NOT BEING DISPLAYED | DO NOT PRINT (THOUGH PRINTING IS ALLOWED IN SILENT MODE) |
| | WHEN COMMERCIAL BEGINS | PRINT IN NORMAL MODE |
| | WHEN COMMERCIAL ENDS | INTERRUPT PRINTING (THOUGH PRINTING IS ALLOWED TO CONTINUE IN SILENT MODE) |
| SECOND EMBODIMENT | WHEN POWER SUPPLY IS ON | DO NOT PRINT (THOUGH PRINTING IS ALLOWED IN SILENT MODE) |
| | WHEN POWER SUPPLY IS OFF | PRINT IN NORMAL MODE |
| | WHEN POWER SUPPLY TRANSITIONS FROM OFF TO ON | INTERRUPT PRINTING (THOUGH PRINTING IS ALLOWED TO CONTINUE IN SILENT MODE) |

U.S. PATENT DOCUMENTS

| | | | | |
|---|---|---|---|---|
| 2004/0263533 | A1 | 12/2004 | Yamamoto et al. | 345/619 |
| 2006/0133773 | A1 * | 6/2006 | Ohmura et al. | 386/68 |

FOREIGN PATENT DOCUMENTS

| | | | |
|---|---|---|---|
| JP | 7-182725 | | 7/1995 |
| JP | 2001-237783 | A | 8/2001 |
| JP | 2001-253152 | A | 9/2001 |
| JP | 2003-308182 | A | 10/2003 |
| JP | 2003-316557 | A | 11/2003 |
| JP | 2004-167841 | | 6/2004 |
| JP | 2004-181806 | | 7/2004 |
| JP | 2004-272672 | A | 9/2004 |
| JP | 2005-12766 | A | 1/2005 |

OTHER PUBLICATIONS

International Search Report and Written Opinion in PCT/JP2006/315833.

* cited by examiner

FIG. 1

| | 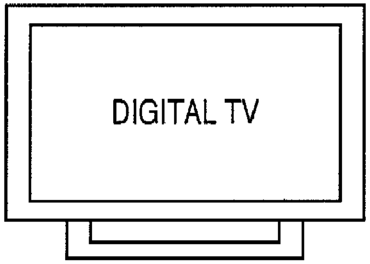 | PRINTER 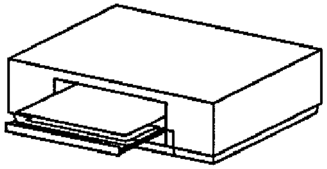 |
|---|---|---|
| FIRST EMBODIMENT | WHEN COMMERCIAL IS NOT BEING DISPLAYED | DO NOT PRINT (THOUGH PRINTING IS ALLOWED IN SILENT MODE) |
| | WHEN COMMERCIAL BEGINS | PRINT IN NORMAL MODE |
| | WHEN COMMERCIAL ENDS | INTERRUPT PRINTING (THOUGH PRINTING IS ALLOWED TO CONTINUE IN SILENT MODE) |
| SECOND EMBODIMENT | WHEN POWER SUPPLY IS ON | DO NOT PRINT (THOUGH PRINTING IS ALLOWED IN SILENT MODE) |
| | WHEN POWER SUPPLY IS OFF | PRINT IN NORMAL MODE |
| | WHEN POWER SUPPLY TRANSITIONS FROM OFF TO ON | INTERRUPT PRINTING (THOUGH PRINTING IS ALLOWED TO CONTINUE IN SILENT MODE) |

IMAGE FORMING APPARATUS AND CONTROL METHOD THEREOF

TECHNICAL FIELD

The present invention relates to an image forming apparatus and a control method thereof, which receive a print data from an external device, which includes a television set, and form an image on a medium.

BACKGROUND ART

A printer, such as an inkjet printer, is one embodiment of an image forming apparatus. Conventionally, the printer has typically comprised only a function of receiving a print data from a personal computer and performing a print job thereupon. Such circumstances as a widespread adoption of a digital camera or an increasing diversity of user needs, however, is resulting in a widespread adoption of a printer with a variety of functions. For example, there is a photo direct printer, which incorporates an interface for connecting the printer with a memory card reader or a digital camera, and that is capable of thereby directly extracting a data from either a memory card or the digital camera, and printing the data thus extracted. Another such printer with a variety of functions would be such as a multi-function printer, or MFP, which is configured to be a single unit with a scanner, and which is capable of such processes as making copies in a single device.

In recent times, a digital television (digital TV) and a DVD recorder are also coming into widespread use, and a printer is being developed that is capable of connecting to such devices and printing an information of a data broadcast or from the Internet (hereinafter "digital TV printer" or "printer"). Such a digital TV printer is installed in a vicinity of the digital TV in many circumstances.

The printer comprises a plurality of drive units, however, such as a paper feed mechanism or a printing mechanism, and thus, the printer is prone to making a loud noise in the course of an operation thereof. While progress has been made in recent years with regard to noise reduction in the printer, the noise that the printer makes in the course of its operation continues to be unpleasant and unwelcome to a user, i.e., a viewer, of the TV.

In response to the problem, Japanese Paten Laid Open No. 2004-167841 (Cited Reference 1) discloses a method of distinguishing whether or not the TV is in operation by detecting a sound from the TV, and having the printer switch into a reduced noise of operation mode, i.e., a silent mode, when printing while the TV is in operation.

DISCLOSURE OF INVENTION

Problems that the Invention is Intended to Solve

While the method disclosed in the Cited Reference 1 seeks to minimize the noise of the operation of the printer by causing the printer to operate in the silent mode, by no means does the noise of the operation of the printer cease altogether. Consequently, it is possible, for example, for the noise of the operation of the printer to continue to be a nuisance at such times as when the user is concentrating on watching the TV when the audio of such as a movie or a TV drama show is at a low volume.

The present invention was devised with such a circumstance as the foregoing in mind, and has as an objective to provide a technology that avoids letting a sound that the image forming apparatus makes in the course of the operation thereof interfere with the user watching television.

Means to Solve the Problems

In order to solve the foregoing problems, an image forming apparatus of the present invention is an image forming apparatus, which is connected so as to be capable of communicating with at least one external apparatus, which includes a television, the image forming apparatus comprising: a receiving unit configured to receive a print command and a print data from the external apparatus; a printing unit configured to print the print data that is received by the receiving unit; an acquisition unit configured to acquire a state of the television; and a printing control unit configured to control the printing unit such that, when the print command is received by the receiving unit, the printing unit performs a printing of the print data if the state that is acquired by the acquisition unit is a first state, and the printing unit waits until the state transitions to the first state before performing the printing of the print data if the state that is acquired by the acquisition unit is a second state.

Moreover, a control method of an image forming apparatus of the present invention is a control method of an image forming apparatus, which is connected so as to be capable of communicating with at least one external apparatus, which includes a television, the control method comprising the steps of: receiving a print command and a print data from the external apparatus; printing the print data that is received in the receiving step; acquiring a state of the television; and controlling the printing step such that, when the print command is received in the receiving step, the printing step performs a printing of the print data if the state that is acquired in the acquisition step is a first state, and the printing step waits until the state transitions to the first state before performing the printing of the print data if the state that is acquired in the acquisition step is a second state.

Effects of the Invention

According to the present invention, it will be possible, given the preceding configuration, to suppress a noise that an image forming apparatus makes in the course of an operation thereof from interfering with a user who is watching television.

Additional benefits and characteristics of the present invention will become apparent from the following descriptions, with reference to the attached drawings. Similar or identical configurations in the drawings will be denoted with identical reference numerals.

BRIEF DESCRIPTION OF DRAWINGS

FIG. 1 denotes an overview of a first and a second embodiment.

201. Digital TV

203. Printer

701. Commercial Determination Unit

1101. TV Power State Detection Unit

BEST MODE FOR CARRYING OUT THE INVENTION

Figure 2:
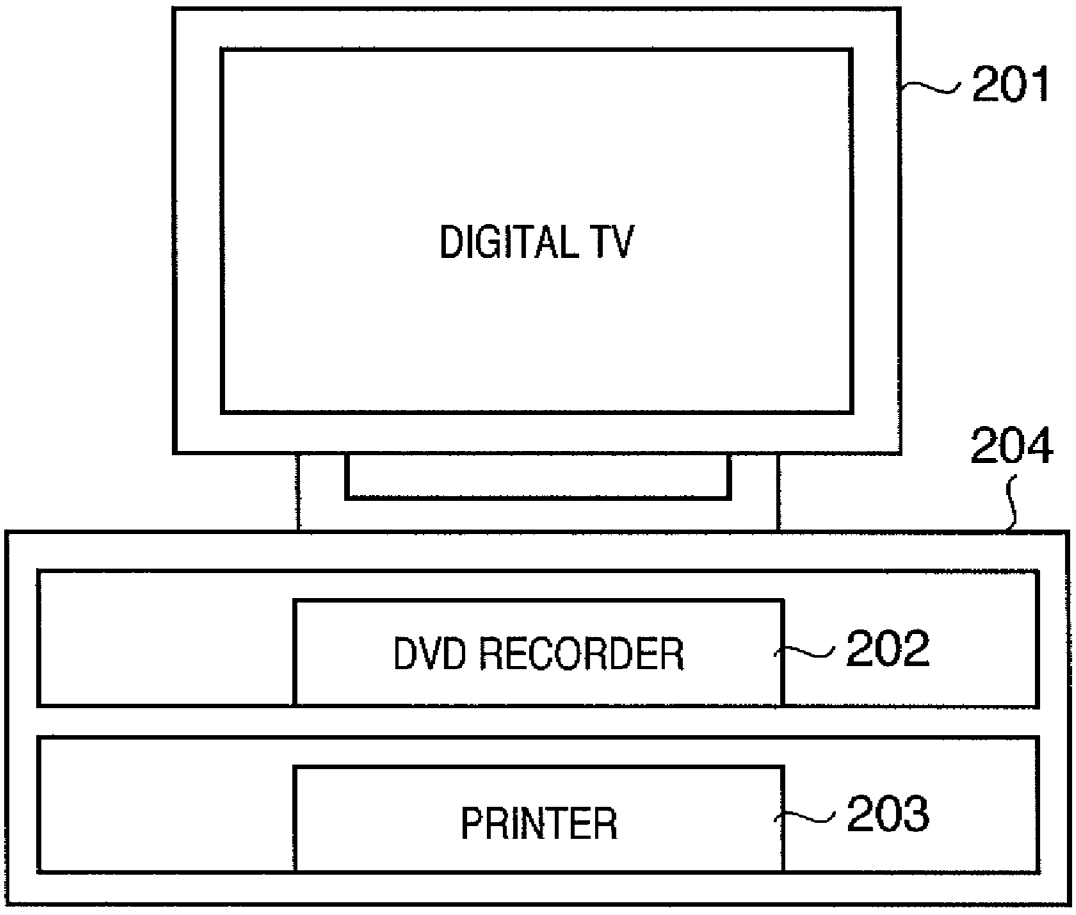
FIG. 2 depicts an installation example of a printer and other apparatuses according to the first embodiment.

Following is a description of embodiments of the present invention, with reference to the attached drawings. The respective embodiments described hereinafter serve to explain such concepts of the present invention as high-level, mid-level, and low-level concepts thereof.

The technological scope of the present invention is defined by the scope of the claims, and is not restricted by the following respective embodiments. Nor are all combinations of the characteristics described according to the embodiments necessarily required for the present invention.

FIG. 1 denotes an overview of a first and a second embodiment, to be described hereinafter.

While each respective embodiment hereinafter describes a digital TV that comprises a network interface as an example of a TV, the TV is not limited thereto. It would be permissible for the TV to be a digital TV that does not comprise a network interface, for example. It would also be permissible for the TV to be an analog TV.

If the television set does not comprise the network interface, then the digital or analog TV is directly connected to an image forming apparatus (i.e., a printer in the present embodiment). In such a circumstance, the printer will not be able to use a function that originates on a network, for example, printing a data that is acquired from the Internet. The printer will be able to use other functions in a manner similar to what would be possible when the TV does comprise the network interface, however.

According to the first embodiment, whether or not a commercial is being displayed is employed as a state of the digital TV to change an operation of the printer. More specifically, when the digital TV is displaying a TV drama program or other program, i.e., when a commercial is not being displayed, the printer does not perform a print job even if it receives a print command, in order to avoid giving off a noise in the course of an operation thereof. It would be permissible, however, for the printer to perform the print job in a silent mode when the commercial is not being displayed, in such a circumstance as when a clear and unambiguous command to do so is issued, or for a very important print data. When the commercial begins to be displayed, the printer performs the print job in a normal modenormal mode at high speed. If the printer is in the middle of the print job when the commercial ends, the printer interrupts the print job. The printing of the page that is being printed at the time that the commercial ends will be completed first, however, followed by the interruption of the print job. It would also be permissible for the print job to continue with the next page and thereafter in the silent mode, instead of being interrupted.

According to the second embodiment, the operation of the printer is changed using whether or not the power supply of the digital TV is on or off as a standard for determination, as opposed to the operation of the printer being changed using whether or not the commercial is being displayed as the standard for determination, according to the first embodiment. The condition of the digital TV being powered on corresponds to the condition of the commercial not being displayed according to the first embodiment, a transition from the digital TV being powered off to being powered on corresponds to the condition of the commercial coming to an end according to the first embodiment, and the operation of the printer is similar thereto in each respective circumstance.

First Embodiment

System Configuration

FIG. 2 depicts an installation example of a printer and other apparatuses according to the first embodiment. The digital TV 201 is mounted on top of a TV rack 204, and a DVD recorder 202 and a printer 203 are installed within the TV rack 204. A hard drive (hard disk) is typically installed within the DVD recorder 202, and the DVD recorder 202 is capable of recording and playing a TV program. The printer 203, which may be either an inkjet printer or a laser printer, will be described hereinafter as an inkjet printer.

Figure 3:
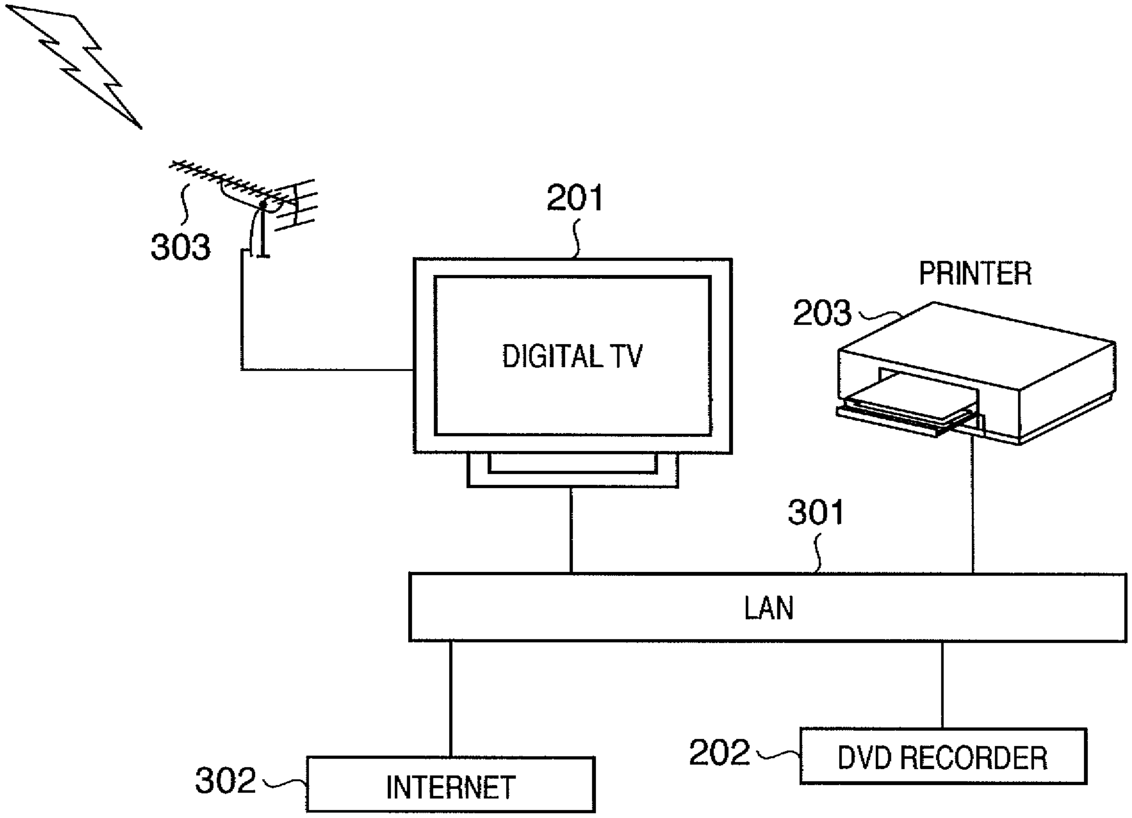
FIG. 3 is a block diagram depicting a system configuration according to the first embodiment.

FIG. 3 is a block diagram depicting a system configuration according to the first embodiment. The digital TV 201, the DVD recorder 202, and the printer 203 are connected bi-directionally to one another via a local area network (LAN 301). The LAN 301 is connected to an Internet 302, and it is thereby possible to perform a sending and a receiving of information. It would be possible for the LAN 301 to be configured as either a wired or a wireless network.

An antenna 303 is connected to the digital TV 201, thereby enabling the digital TV 201 to receive a broadcast signal.

Configuration of the Printer 203

Figure 4:
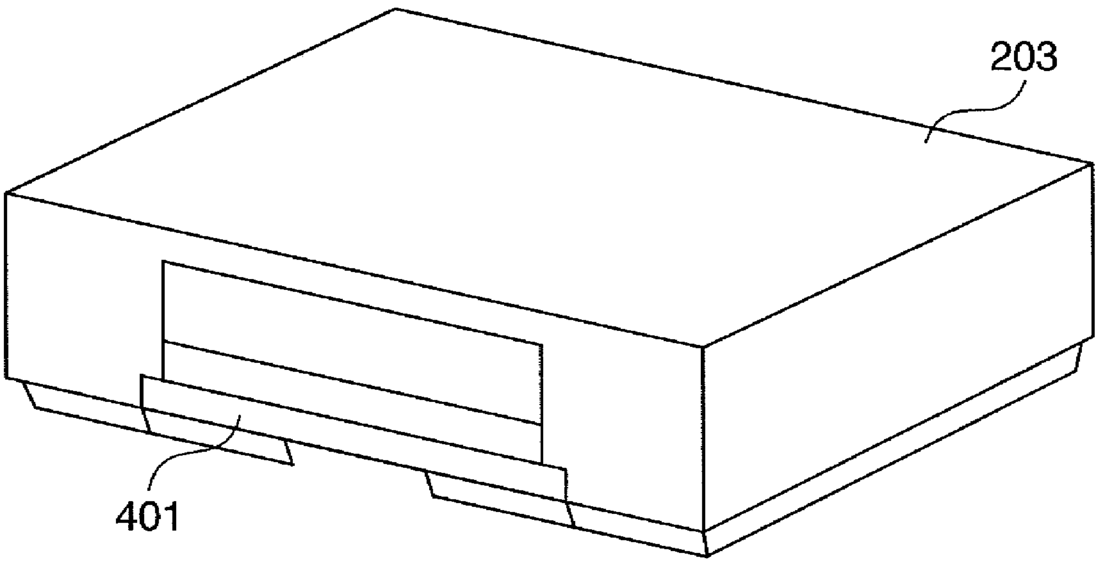
FIG. 4 is an external oblique view of a printer 203.
Figure 5:
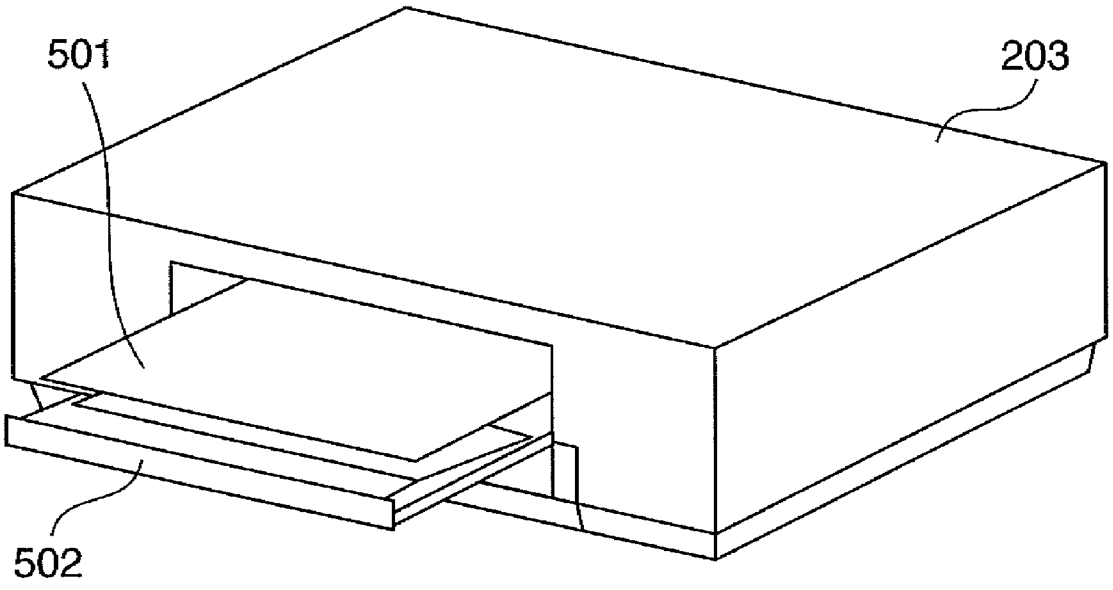
FIG. 5 is an external oblique view of the printer 203.
Figure 6:
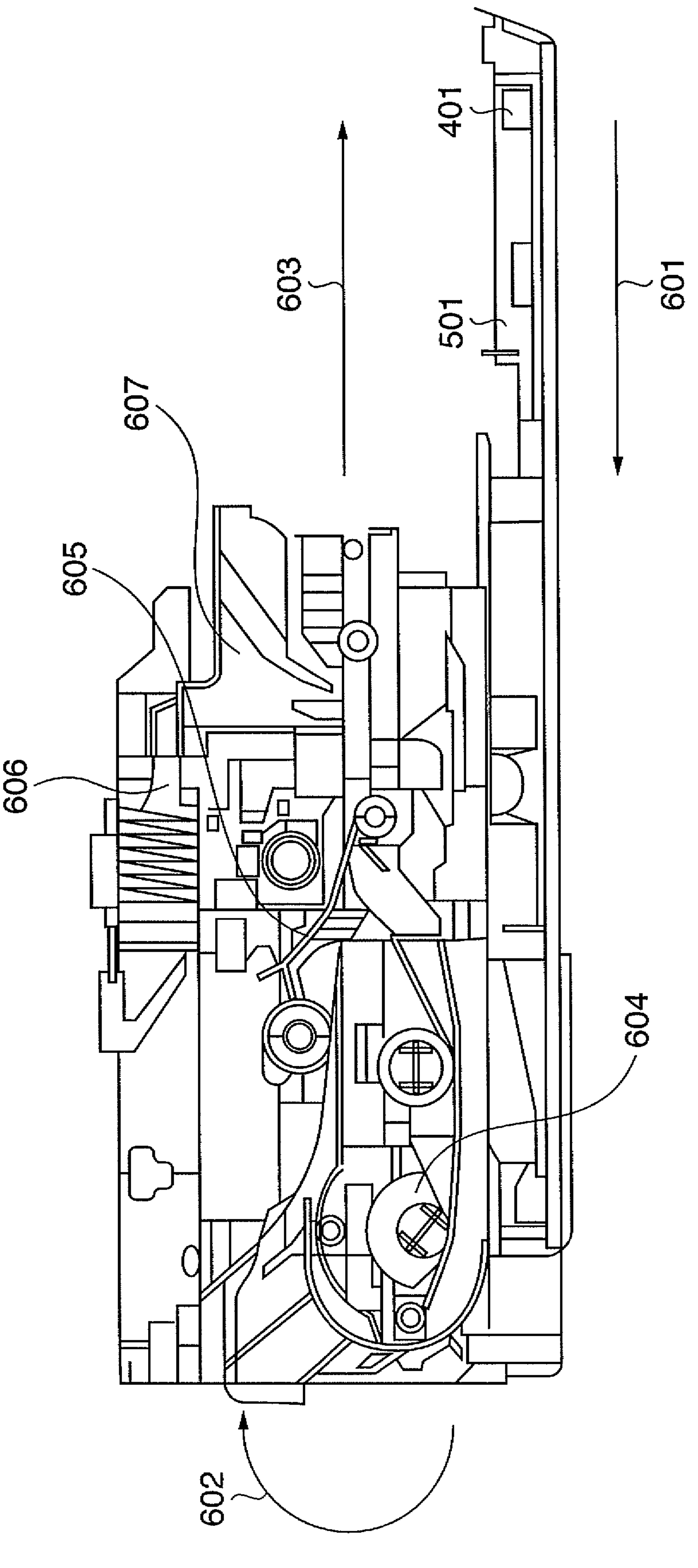
FIG. 6 is a fundamental cutaway view that depicts an internal mechanism of the printer 203.

Following is a description of the printer 203, with reference to FIG. 4-FIG. 6.

FIG. 4 and FIG. 5 are external oblique views of the printer 203.

A recording paper 501 that is loaded into a paper feed cartridge 401 is conveyed one sheet at a time to a recording unit by a paper feed apparatus within the printer 203, and the recording paper 501 whereupon the printing is carried out is discharged to a paper discharge tray 502. FIG. 4 depicts a state of the printer 203 when in a print standby mode or under another such state wherein the printer is not printing, and FIG. 5 depicts a state of the printer 203 when the print paper whereupon the printing is carried out is discharged.

FIG. 6 is a fundamental cutaway view that depicts an internal mechanism of the printer 203. The recording paper 501 is conveyed in a direction denoted by an arrow 601-603, in numerical order thereby.

The recording paper 501 that is loaded into the paper feed cartridge 401 is fed by a paper feed apparatus 604 separately, one sheet at a time, in the direction of the arrow 601, and is conveyed thereby in a u-turn in the direction of the arrow 602 to a recording unit 605. In the present circumstance, a paper type sensor (not shown) is installed within the path, which detects and identifies a surface state of surface to be printed of the recording paper 501 being thus fed into the printer. The recording paper 501 is printed in the recording unit 605 under an ink discharge condition that is optimal according to the print paper type of the recording paper 501, as determined by the paper type sensor (not shown), and is thereafter outputted in the direction of the arrow 603. The recording unit 605 comprises a carrier 606 that performs a forward and a reverse scan in a vertical direction of the face of the printing paper. The carrier 606 is fitted with a recording head 607, and is configured such that, while scanning, an ink droplet is discharged via a nozzle (not shown) onto the recording paper 501, thus forming, i.e., printing, an image.

Function Block of the Digital TV 201 and the Printer 203

Figure 7:
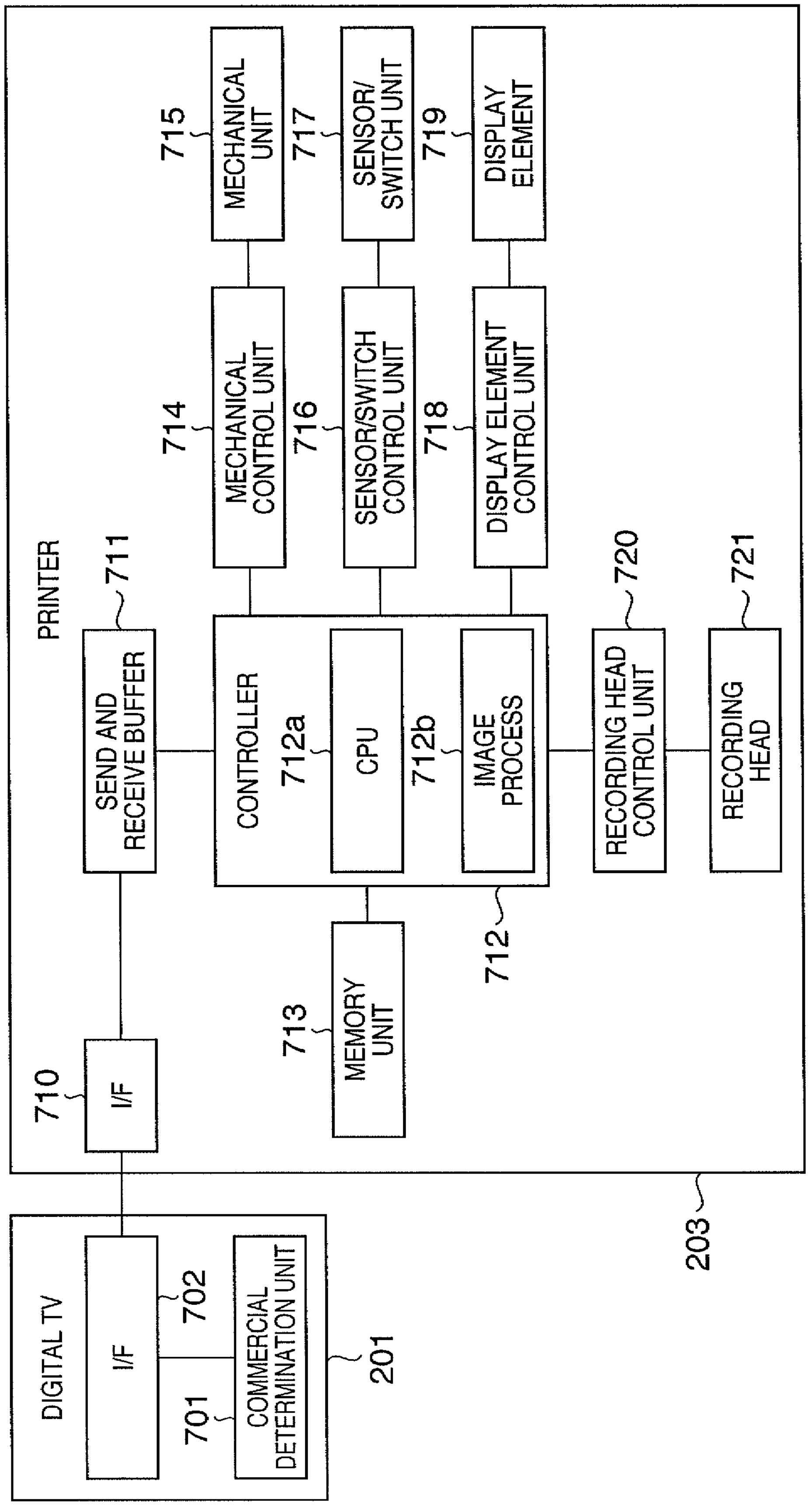
FIG. 7 is a function block diagram depicting a configuration of a digital TV 201 and the printer 203, according to the first embodiment.

FIG. 7 is a function block diagram depicting a configuration of the digital TV 201 and the printer 203. The printer 203 is capable of connecting via the LAN 301 to the digital TV 201, and is capable of receiving a command signal, for example, a print signal, from the digital TV 201 thereby. The printer 203 is also capable of receiving a data to be printed, such as a text or an image (hereinafter "print data"), and print the image that corresponds to the print data onto to the recording paper 501.

A commercial determination unit 701 possesses a function that determines whether a content being output (or displayed) at a given time on the digital TV 201 is a commercial or not. It would be possible to use an arbitrary published technology for the determination thereof, and a method exists such as using a fact that a monaural broadcast signal that is used during an actual program switches to a stereo broadcast signal for the commercial, such as is disclosed in Japanese Patent Laid Open No. 7-182725.

An interface 702 is a communication interface for connecting the digital TV 201 to the LAN 301. The digital TV 201 is capable of transmitting to the printer 203, via the interface 702, the command signal, the print data, or a commercial determination data that is determined by the commercial determination unit 701.

An interface 710 is a communication interface for connecting the printer 203 to the LAN 301.

A send and receive buffer 711 is an area that temporarily stores a data that is sent and received between the printer 203 and the digital TV 201, via the interface 710.

A controller 712 internally comprises a CPU 712*a* and an image processing unit 712*b*. The CPU 712*a* controls the printer 203, in accordance with the command signal that is received via the interface 710, or with a feedback signal that is received from each respective control unit (to be described hereinafter). The image processing unit 712*b* processes the print data, such as parsing and unpacking, or restoring, a compressed image data.

A memory unit 713 is a random access memory (RAM) that temporarily stores such as the print data that is received by the printer 203.

A mechanical control unit 714 controls a drive of a mechanical unit 715, such as a carrier motor, a line feed motor, a paper feed motor, or a small cartridge drive motor.

A sensor/switch control unit 716 processes a signal from a sensor/switch unit 717, including such as a size detection sensor or the paper type sensor.

A display element control unit 718 controls a display element 719, such as an LED display panel group or a liquid crystal display element.

A recording head control unit 720 controls a recording head 721.

Each respective control unit operates in accordance with a command from the controller 712, and sends such as the feedback signal to the controller 712 as necessary. For example, the recording head control unit 720 sends to the controller 712 such information that depicts a state of the recording head 721 as temperature information.

Printing Mode of the Printer 203

The printer 203 comprises, at a minimum, two printing modes, that is to say, a normal modenormal mode and a silent mode. In the normal modenormal mode, the printer 203 performs the print job with a priority on printing speed rather than reducing the volume of the noise of the operation of the printer. In the silent mode, the printer 203 performs the print job with the noise of the operation of the printer reduced, albeit at a reduced speed, which is achieved by such as by slowing down a speed of rotation of the motors that are incorporated within the mechanical unit 715.

Flow of Print Command Process

Figure 8:
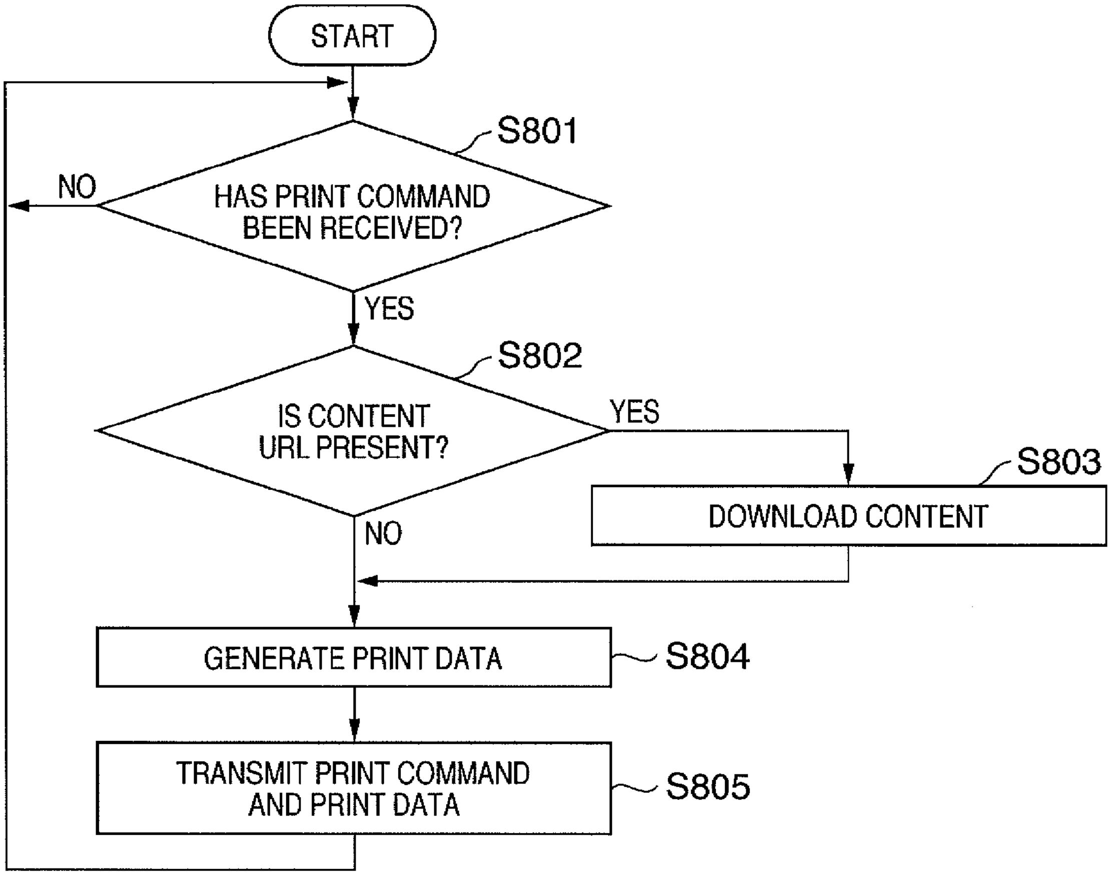
FIG. 8 is a flowchart depicting a flow of a process wherein the digital TV 201 receives a command from a user and transmits a print command and a print data to the printer 203.

FIG. 8 is a flowchart depicting a flow of a process wherein the digital TV 201 receives a command from a user and transmits a print command and a print data to the printer 203. It would be permissible for an external apparatus other than the digital TV 201, for example, the DVD recorder 202, to receive the command from the user, and transmit the print command to the printer 203.

In step S801, the digital TV 201 determines whether or not the print command has been received from the user, and proceeds to step S802 when the print command is received. The print command that is received from the user is received via such as a remote control (not shown), or a control panel (not shown), of the digital TV 201.

In step S802, the digital TV 201 determines that the print command commands a download of a data over the Internet, as well as whether or not a URL that denotes the data, i.e., a content URL, is incorporated within such as the broadcast signal. If the content URL is thus incorporated, the process proceeds to step S803. If the content URL is not thus incorporated, the process proceeds to step S804.

In step S803, the digital TV 201 queries the content URL and downloads the data, i.e., the content, from the Internet.

In step S804, the digital TV 201 generates the print data, in accordance with the content that is downloaded in step S803, as well as the print command that is received in step S801. The print data denotes, for example, an image data that is downloaded from the Internet, or an image data that the digital TV 201 is displaying.

In step S805, the digital TV 201 transmits the print command and the print data to the printer 203, via the interface 702. Whereupon the process returns to step S801, and awaits a successive print command.

Flow of the Print Process

Figure 9:
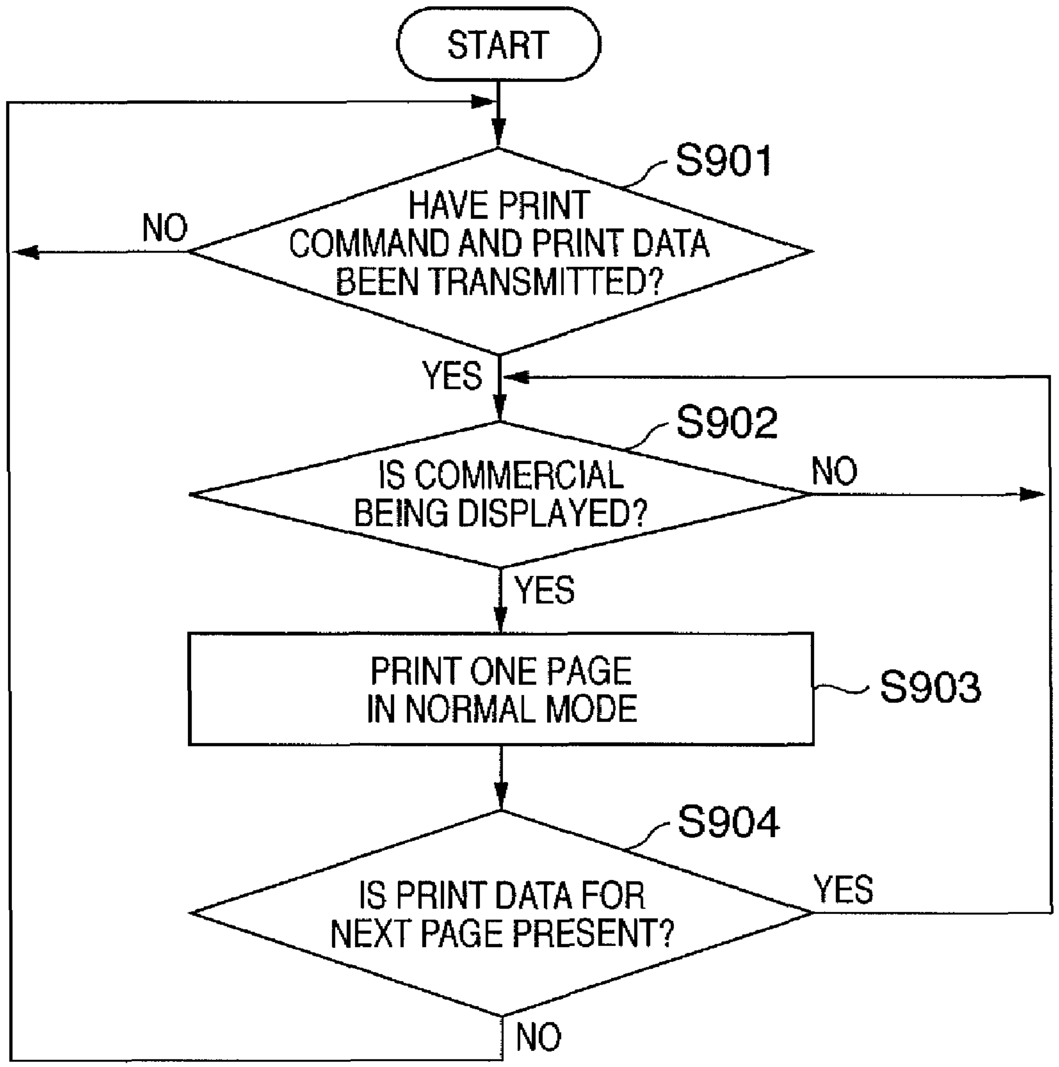
FIG. 9 is a flowchart depicting a flow of a printing process by the printer 203 according to the first embodiment.

FIG. 9 is a flowchart depicting a flow of a printing process by the printer 203.

In step S901, the controller 712 determines whether or not the printer 203 has received the print command and the print data from the digital TV 201, via the interface 710. If the printer 203 has received the print command and the print data, the process proceeds to step S902. It would be permissible for the printer 203 to receive the print command and the print data from an external apparatus other than the digital TV 201, for example, the DVD recorder 202.

In step S902, the controller 712 determines, in accordance with the determination data of the commercial determination unit 701 that is received from the interface 710, whether or not what is being displayed on the digital TV 201 at the present time is the commercial. If the commercial is not being displayed at the present time, the process waits until the commercial is being displayed. If the commercial is being displayed, the process proceeds to step S903.

In step S903, the controller 712 prints one page that is incorporated in the print data, using the normal modenormal mode of the printer 203.

In step S904, the controller 712 determines whether or not a data of a next page that is to be printed is present within the print data. If the data is present, the process returns to step S902, wherein the controller 712 once more performs the determination as to whether or not the digital TV 201 is displaying the commercial. If it is determined herein that the digital TV 201 is displaying the commercial, a state will apply wherein the print job is interrupted until the commercial is finished.

If the data of the next page that is to be printed is not present, the process returns to step S901, wherein the process waits for the next print command.

According to the preceding process, it is possible to suppress the noise of the operation of the printer 203 from interfering with the user watching the digital TV 201, given that the printer 203 performs the print job only when the digital TV 201 is displaying the commercial, and does not perform the print job when the digital TV 201 is displaying the actual program, such as the TV drama.

Variant Examples

Figure 10:
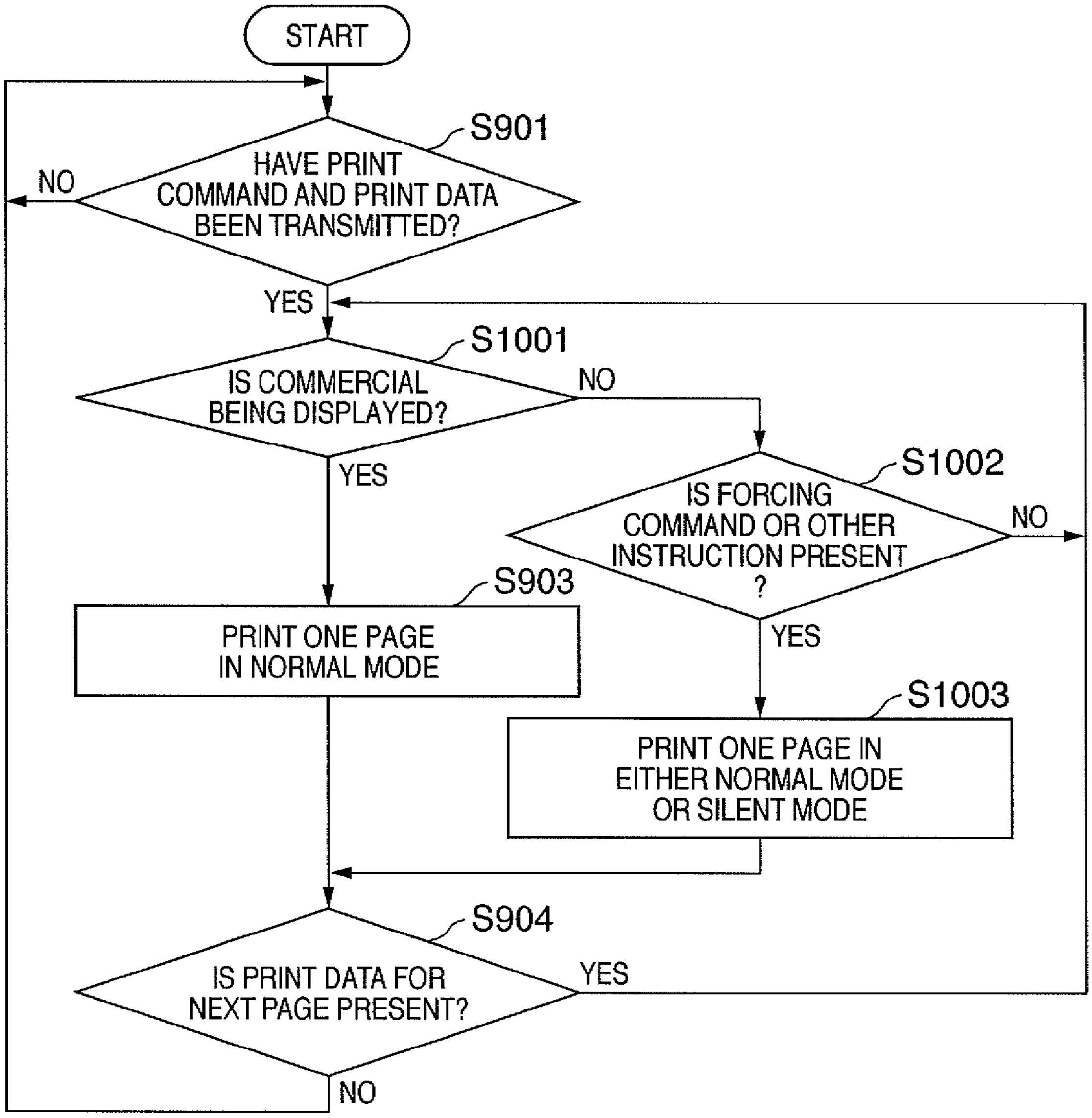
FIG. 10 is a flowchart that describes a variant example of the printing process by the printer 203 according to the first embodiment.

Following is a description of a variant example of the printing process that was described with reference to FIG. 9. FIG. 10 is a flowchart that depicts the variant example. A step that performs a process that is identical with a process that is performed in a step in FIG. 9 is denoted with an identical reference numeral, and a description thereof will accordingly be omitted herein.

In step S1001, the controller 712 determines, in accordance with the determination data of the commercial determination unit 701 that is received from the interface 710, whether or not what is being displayed on the digital TV 201 at the present time is the commercial. If the commercial is being displayed at the present time, the process proceeds to step S1002, in a departure from the circumstance that obtains with step S902.

In step S1002, the controller 712 determines whether or not the printer 203 satisfies a condition for performing the print job even while the commercial is being displayed, such as a forcing command (to be described in detail hereinafter). If the printer 203 does satisfy the condition, the process proceeds to step S1003. If the printer 203 does not satisfy the condition, the process returns to step S1001.

In step S1003, the controller 712 prints one page that is incorporated in the print data, using either the normal modenormal mode or the silent mode of the printer 203. It would be permissible to determine whether to use the normal mode or the silent mode when the printer 203 is being designed, or to configure the printer 203 so as to allow the user to set whether to use the normal mode or the silent mode via such as the digital TV 201 or a control panel (not shown).

Following is a detailed description of the condition depicted in step S1002.

In a first instance, there is a circumstance wherein the user desires to perform the print job even if the digital TV 201 is displaying the actual program, such as the TV drama, rather than the commercial. In such a circumstance, if the controller 712 of the printer 203 receives a print forcing command from the user, via such as the digital TV 201 or the control panel (not shown), the printer 203 performs the print job in either the normal mode or the silent mode, according to a content of the command.

In particular, the printer 203 performs the print job in the normal mode when the commercial is being displayed, and performs the print job in the silent mode, which reduces the noise of the operation of the printer below the noise level that is emitted in normal mode, when the actual program, and not the commercial, is being displayed.

The preceding description described printing in the normal mode while the commercial is being displayed. The present invention would be applicable, however, regardless of which sort of print mode the printer operates in, if the mode generates a louder noise of operation than the silent mode.

In a second instance, it would be permissible to configure such as the digital TV 201 so as to append information to the print data that denotes a level of importance. In such a circumstance, for example, the printer 203 would print a data with a high level of importance, such as a text that is used in a program that is being displayed by the digital TV 201 at the present time, in either the normal mode or the silent mode, even if the commercial is not being displayed. A data that is not important does not satisfy the condition that is depicted in step S1002, and thus, the printer 203 waits to print until the digital TV 201 displays the commercial.

In a third instance, it would be permissible to configure the printer 203 so as to continue the print job in either the normal mode or the silent mode until all pages have been printed, when the commercial finishes while a print data that spans a plurality of pages is being printed. Doing so thus makes it possible to prevent the print job from being interrupted in a halfway.

Given the variant examples, it would be possible to determine, in a flexible manner, whether or not the printer 203 will perform the print job in response to such as the demand of the user or the level of importance of the print data, even when the digital TV 201 is not displaying the commercial.

While it would be possible, as per the foregoing, to print in either the normal mode or the silent mode when performing the print job while the digital TV 201 is not displaying the commercial, it would be preferable to print in the silent mode in such a circumstance. The reason is that doing so allows minimizing the noise of operation of the printer 203, and thereby preventing the noise of operation thereof from interfering with the user watching television.

Following is a description, albeit irrelevant to the condition that is depicted in step S1002, of a variant example that improves the convenience of the printer 203 for the user.

In a fourth instance (continuing in numerical order from the third instance for ease of description), it would be permissible to notify the user when the printer 203 is suspending the print job, i.e., waiting for the commercial to be displayed, such as in step S902 or in step S1001. The notification would be performed, for example, by displaying a message on such as a display element 719, the screen of the digital TV 201, or the remote control, such that the user will be able to recognize the notification thereof. Doing so thus makes it possible for the user to easily recognize the present state of the printer 203, and, for example, such a notification would serve as a material for determining whether or not the user should perform the print forcing command that was described in the first instance.

In a fifth instance, it would be permissible to configure the printer 203 to receive the information as to whether or not the digital TV 201 is displaying the commercial, not from the digital TV 201, but rather, from an apparatus other than the digital TV 201, such as the DVD recorder 202 while it plays a recorded program, for example. Doing so allows determining the state of the digital TV 201 from a variety of sources of information, and enables the application of the present invention even when the digital TV 201 does not comprise the commercial determination unit 701, for example.

Per the foregoing description, according to the embodiment, upon receiving the print command, the printer 203 performs the print job in the normal mode when the digital TV 201 is displaying the commercial, and does not perform the print job when the digital TV 201 is not displaying the commercial, instead suspending the print job until the start of the commercial.

Doing so thus allows preventing or suppressing the noise of operation of the printer 203 when the digital TV 201 is displaying a program other than the commercial, and thereby suppressing the interference of the watching by the user of the digital TV 201.

Second Embodiment

According to the first embodiment, a determination is made as to whether or not the printer 203 performs the print job based on whether the digital TV 201 depicted in FIG. 2 is displaying the commercial or a program other than the commercial. According to the second embodiment, a determination is made as to whether or not the printer 203 performs the print job based on whether the digital TV 201 is powered on or off.

A circumstance is presumed according to the embodiment wherein the printer 203 either receives the print data from the digital TV 201 prior to the power to the digital TV 201 being switched off, or else receives the print data from a network (not shown), when an implementation according to the embodiment takes place.

According to the embodiment, it would be permissible for such as the system configuration, i.e., FIG. 2-FIG. 6, to be similar to such as the system configuration as depicted according to the first embodiment, and a description thereof will accordingly be omitted herein.

Function Block of the Digital TV 201 and the Printer 203

Figure 11:
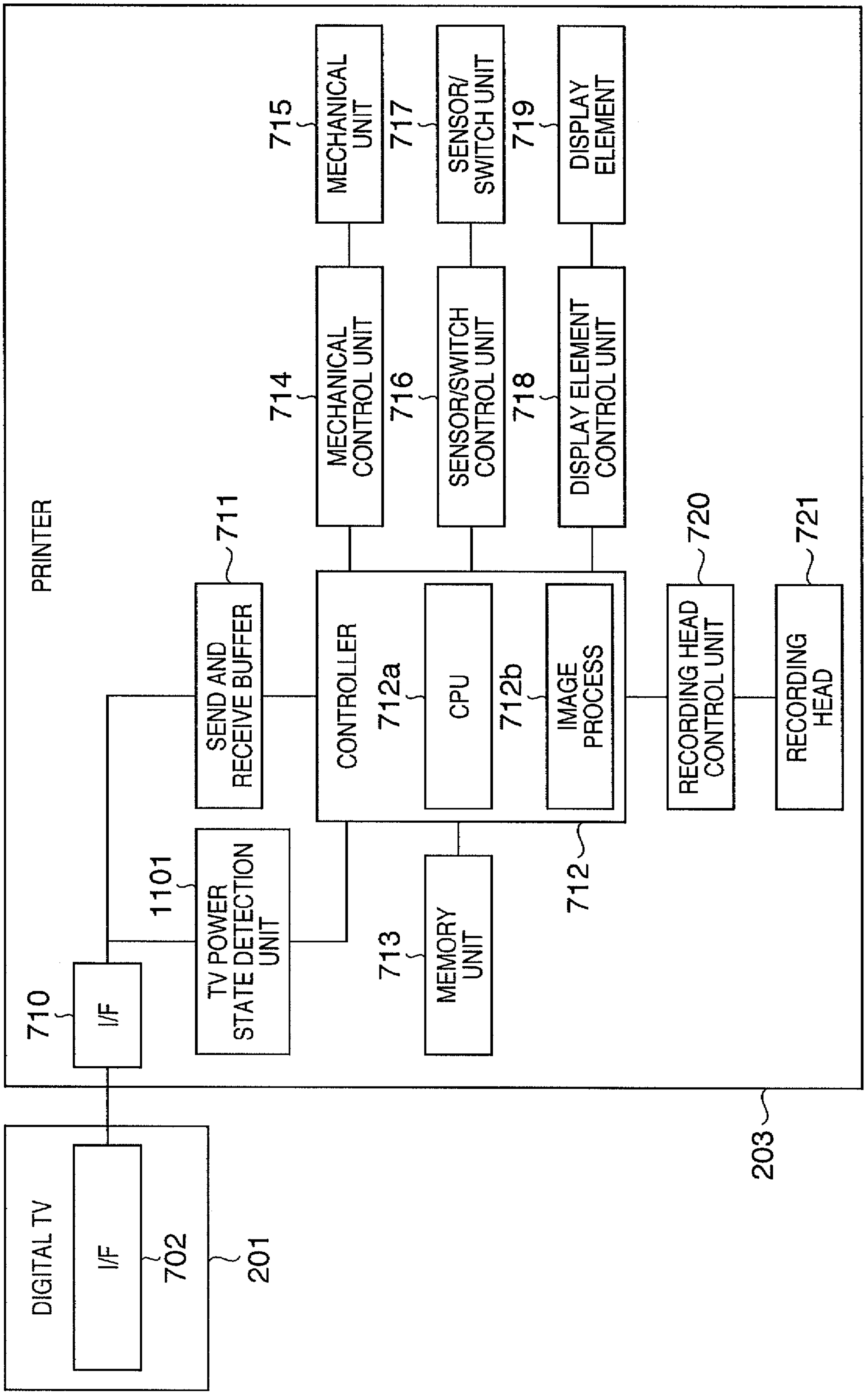
FIG. 11 is a function block diagram that depicts a configuration of the digital TV 201 and the printer 203, according to the second embodiment.

FIG. 11 is a function block diagram that depicts a configuration of the digital TV 201 and the printer 203. An element that is identical with an element that is depicted according to the first embodiment, i.e., in FIG. 7, is denoted with an identical reference numeral, and a description thereof will accordingly be omitted herein.

The printer 203 according to the embodiment comprises a TV power state detection unit 1101. The TV power state detection unit 1101 determines whether the digital TV 201 is powered on or off. The determination thereof may be carried out, for example, by the TV power state detection unit 1101 transmitting a test packet to the digital TV 201 via the interface 710, and verifying a response, or a lack thereof, to the test packet thus transmitted. It would be possible to use another arbitrary published method for the determination thereof, such as employing a hardware-oriented method that connects a separate line that outputs the power on or power off state of the digital TV 201.

Flow of the Print Process

Figure 12:
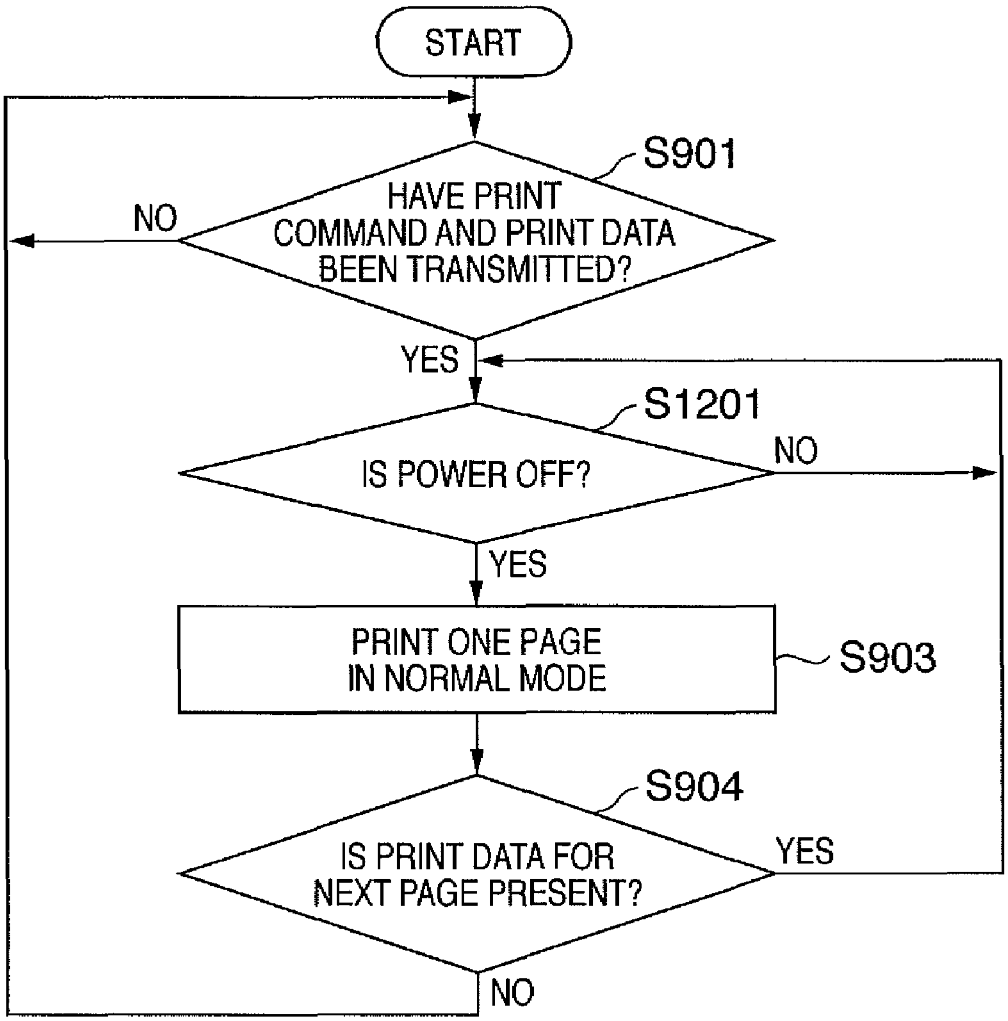
FIG. 12 is a flowchart depicting a flow of a printing process by the printer 203 according to the second embodiment.

FIG. 12 is a flowchart depicting a flow of a printing process by the printer 203. A step that performs a process that is identical with a process that is performed in a step according to the first embodiment, i.e., in FIG. 9, is denoted with an identical reference numeral, and a description thereof will accordingly be omitted herein. A flow of a process of a print command is similar to the flow of the process of a process of the print command according to the first embodiment, i.e, in FIG. 8, and a description thereof will accordingly be omitted herein.

In step S1201, the TV power state detection unit 1101 determines whether the digital TV 201 is powered on or off. If the digital TV 201 is powered off, the process proceeds to step S903, whereas if the digital TV 201 is not powered off, the process waits until the digital TV 201 is powered off.

Variant Examples

Figure 13:
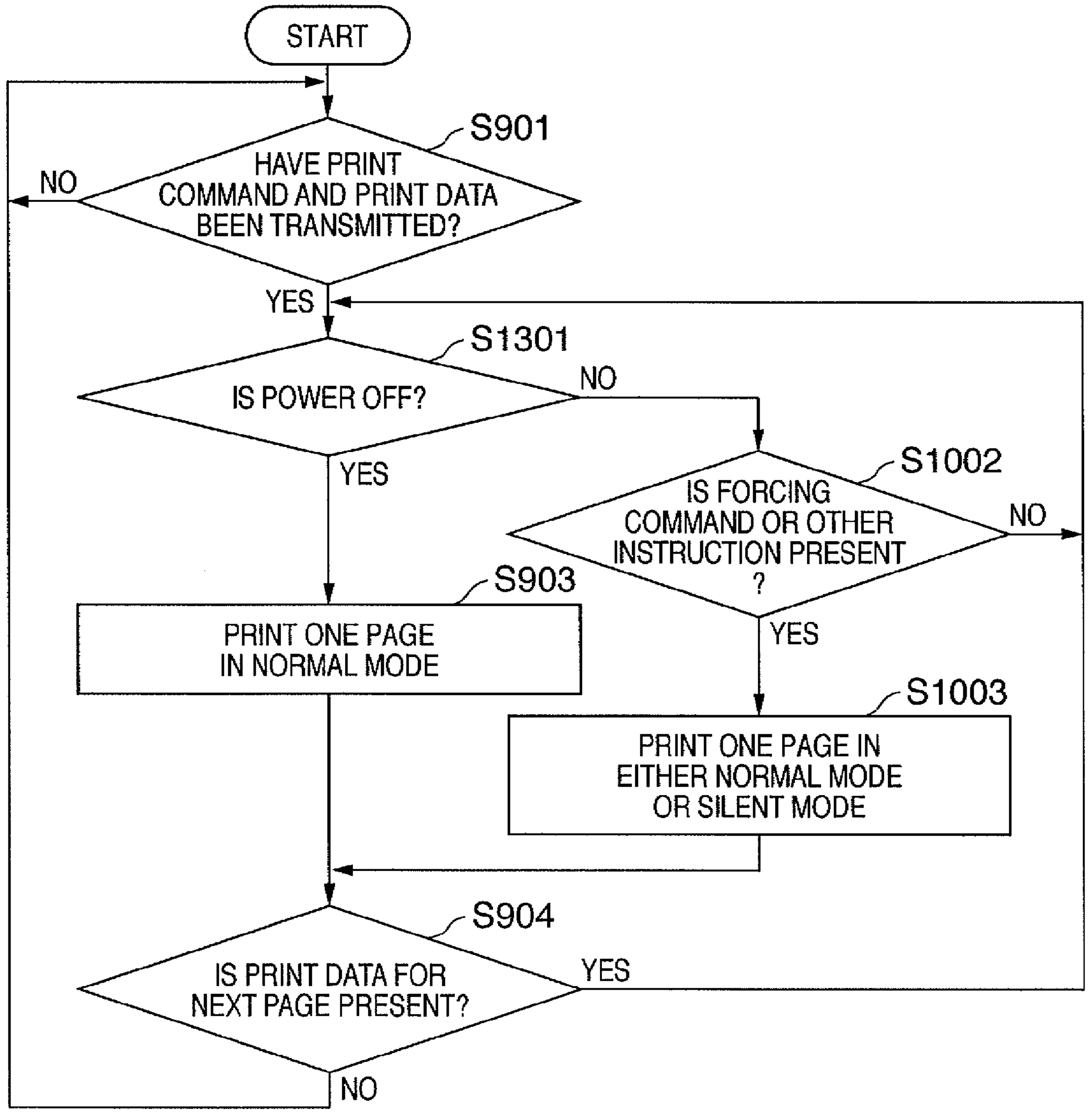
FIG. 13 is a flowchart that describes a variant example of the printing process by the printer 203 according to the second embodiment.

The variant examples of the printing process that is described with reference to FIG. 10 are similar to the variant examples that are described according to the first embodiment, with "power is off" substituted for "commercial being displayed" and "power is on" substituted for "commercial not being displayed, i.e., program other than commercial being displayed." FIG. 13 is a flowchart that describes the variant examples thereof, with a step that performs a process that is identical with a process that is performed in a step in FIG. 10 being denoted with an identical reference numeral.

Per the foregoing description, according to the embodiment, upon receiving the print command, the printer 203 performs the print job in the normal mode when the digital TV 201 is powered off, and does not perform the print job when the digital TV 201 is powered on, instead suspending the print job until the digital TV 201 is powered off.

Doing so thus allows preventing or suppressing the noise of operation of the printer 203 regardless of whether the digital TV 201 is displaying a commercial or a program other than the commercial, and thereby suppressing the interference of the watching by the user of the digital TV

Other Embodiments

The determination of whether or not the commercial is being displayed is performed with the digital TV 201 according to the embodiment. It would be permissible to configure a digital tuner or each respective control unit as a controller that is separate from the display, and to have the determination of whether or not the commercial is being displayed be made by the controller.

While a signal is communicated to the printer that denotes whether or not the commercial is being displayed according to the embodiment, it would be permissible to transmit a signal that directly commands the printer as to the print mode to use, such as whether to print in the silent mode or to print in the normal mode.

It would be permissible to provide a recording medium to a system or an apparatus whereupon is recorded a program code of a software that implements each respective function of each respective process according to the embodiment. It would be possible to carry out the function of the embodiment by having a computer, or a CPU or an MPU, of the system or the apparatus load and execute the program code that is stored on the recording medium. In such a circumstance, the program code itself that is loaded from the recording medium carries out the function of the embodiment, and the recording medium that stores the program code configures the present invention. It would be possible to employ such as a floppy disk, a hard disk drive, an optical disk, or a magneto-optical (MO) disk, for example, as the recording medium for supplying such a program code. It would also be possible to instead employ such as a CD-ROM, a CD-R, a magnetic tape, a nonvolatile memory card, or a ROM.

Nor is each function of the embodiment implemented solely by the computer executing the program code thus loaded. A circumstance is also included wherein each function of the embodiment is implemented by a process that is actually performed, whether in whole or in part, by an operating system or other software that runs on the computer, in accordance with a command of the program code.

It would further be permissible for the program code that is loaded from the recording medium to be written to a memory that is comprised in an expansion board that is inserted into the computer or into an expansion unit that is connected to the computer. A circumstance is also included wherein, thereafter, a CPU or other hardware that is comprised in the expansion board or the expansion unit performs the actual process, whether in whole or in part, in accordance with the command of the program code, and that each function of the embodiment is implemented by the process thus performed.

It is to be understood that the present invention is not restricted to the embodiments described herein, and that a wide range of changes or variations are allowable without exceeding either the spirit or the scope of the present invention. Accordingly, the following claims are attached to this application in order to disclose the scope of the invention.

This application claims the benefit of Japan Patent Application No. 2005-236003, filed Aug. 16, 2005, and which is incorporated by reference herein in its entirety.

The invention claimed is:

1. An image forming apparatus, which is connected so as to be capable of communicating with at least one external apparatus, which includes a television, the image forming apparatus comprising:

a receiving unit configured to receive a print command and a print data from the external apparatus;

a printing unit configured to print the print data that is received by the receiving unit;

an acquisition unit configured to acquire a state of the television;

a printing control unit configured to control the printing unit such that, when the print command is received by the receiving unit, the printing unit performs a printing of the print data if the state that is acquired by the acquisition unit is a first state, and the printing unit waits until the state transitions to the first state before performing the printing of the print data if the state that is acquired by the acquisition unit is a second state; and a print forcing command receiving unit configured to receive a print forcing command, either from the external apparatus or from a user, wherein the printing control unit controls the printing unit such that, when the print forcing command is received by the print forcing command receiving unit, the printing unit performs the printing of the print data even when the state that is acquired by the acquisition unit is the second state, wherein the acquisition unit acquires the state even while the printing unit is printing the print data, and wherein the printing control unit controls the printing unit such that in the event that the state transitions from the first state to the second state while the printing unit is printing the print data, if a page that remains to be printed is present within the print data after completion of a printing of a page that is being printed, the printing unit interrupts the printing of the print data, and waits until the state transitions back to the first state before printing the page that remains to be printed.

2. The image forming apparatus according to claim 1, wherein the acquisition unit acquires the state from the external apparatus.

3. The image forming apparatus according to claim 1, wherein:

the first state is a state wherein the television is displaying a commercial; and the second state is a state wherein the television is displaying a program other than the commercial.

4. The image forming apparatus according to claim 1, further comprising:

a notification unit configured to notify a user that the image forming apparatus is in a standby state in the event that the image forming apparatus is waiting for the state to transit to the first state.

5. The image forming apparatus according to claim 1, wherein:

the print data includes a level of importance information that denotes a level of importance of the print data, and the printing control unit controls the printing unit such that, in the event that the level of importance information denotes that the level of importance of the print data is a high level, the printing unit performs the printing of the print data even when the state that is acquired by the acquisition unit is the second state.

6. An image forming apparatus, which is connected so as to be capable of communicating with at least one external apparatus, which includes a television, the image forming apparatus comprising:

a receiving unit configured to receive a print command and a print data from the external apparatus;

a printing unit configured to print the print data that is received by the receiving unit;

an acquisition unit configured to acquire a state of the television; and a printing control unit configured to control the printing unit such that, when the print command is received by the receiving unit, the printing unit performs a printing of the print data in a regular mode if the state that is acquired by the acquisition unit is a first state wherein the television is displaying a commercial, and the printing unit performs the printing of the print data in a silent mode, which reduces a noise of an operation of the image forming apparatus when compared with the regular mode, if the state that is acquired by the acquisition unit is a second state wherein the television is displaying a program other than the commercial, wherein the acquisition unit acquires the state even while the printing unit is printing the print data, and wherein the printing control unit controls the printing unit such that in the event that the state transitions from the first state to the second state while the printing unit is printing the print data in the regular mode, if a page that remains to be printed is present within the print data after completion of a printing of a page that is being printed, the printing unit transitions from the regular mode to the silent mode before printing the page that remains to be printed.

7. A control method of an image forming apparatus, which is connected so as to be capable of communicating with at least one external apparatus, which includes a television, the control method comprising the steps of:

receiving a print command and a print data from the external apparatus;

printing the print data that is received in the receiving step;

acquiring a state of the television;

controlling the printing step such that, when the print command is received in the receiving step, the printing step performs a printing of the print data if the state that is acquired in the acquisition step is a first state, and the printing step waits until the state transitions to the first state before performing the printing of the print data if the state that is acquired in the acquisition step is a second state; and receiving a print forcing command, either from the external apparatus or from a user, wherein the printing control step controls the printing step such that, when the print forcing command is received in the print forcing command receiving step, the printing step performs the printing of the print data even when the state that is acquired in the acquisition step is the second state, wherein the acquiring step acquires the state even while the printing step is printing the print data, and wherein the controlling step controls the printing step such that in the event that the state transitions from the first state to the second state while the printing step is printing the print data, if a page that remains to be printed is present within the print data after completion of a printing of a page that is being printed, the printing step interrupts the printing of the print data, and waits until the state transitions back to the first state before printing the page that remains to be printed.

8. The control method of the image forming apparatus according to claim 7, wherein:

the first state is a state wherein the television is displaying a commercial; and the second state is a state wherein the television is displaying a program other than the commercial.

9. A control method of an image forming apparatus, which is connected so as to be capable of communicating with at least one external apparatus, which includes a television, the control method comprising the steps of:

receiving a print command and a print data from the external apparatus;

printing the print data that is received in the receiving step;

acquiring a state of the television; and controlling the printing step such that, when the print command is received in the receiving step, the printing step performs a printing of the print data in a regular mode if the state that is acquired in the acquisition step is a first state wherein the television is displaying a commercial, and the printing step performs the printing of the print data in a silent mode, which reduces a noise of an operation of the image forming apparatus when compared with the regular mode, if the state that is acquired in the acquisition step is a second state wherein the television is displaying a program other than the commercial, wherein the acquiring step acquires the state even while the printing step is printing the print data, and wherein the controlling step controls the printing step such that in the event that the state transitions from the first state to the second state while the printing step is printing the print data in the regular mode, if a page that remains to be printed is present within the print data after completion of a printing of a page that is being printed, the printing step transitions from the regular mode to the silent mode before printing the page that remains to be printed.

10. A computer program stored on a non-transitory computer-readable medium for causing a computer to execute a control method of an image forming apparatus, which is connected so as to be capable of communicating with at least one external apparatus, which includes a television, the control method comprising the steps of:

receiving a print command and a print data from the external apparatus;

printing the print data that is received in the receiving step;

acquiring a state of the television;

controlling the printing step such that, when the print command is received in the receiving step, the printing step performs a printing of the print data if the state that is acquired in the acquisition step is a first state, and the printing step waits until the state transitions to the first state before performing the printing of the print data if the state that is acquired in the acquisition step is a second state; and receiving a print forcing command, either from the external apparatus or from a user, wherein the printing control step controls the printing step such that, when the print forcing command is received in the print forcing command receiving step, the printing step performs the printing of the print data even when the state that is acquired in the acquisition step is the second state, wherein the acquiring step acquires the state even while the printing step is printing the print data, and wherein the controlling step controls the printing step such that in the event that the state transitions from the first state to the second state while the printing step is printing the print data, if a page that remains to be printed is present within the print data after completion of a printing of a page that is being printed, the printing step interrupts the printing of the print data, and waits until the state transitions back to the first state before printing the page that remains to be printed.

11. A computer program stored on a non-transitory computer-readable medium for causing a computer to execute a control method of an image forming apparatus, which is connected so as to be capable of communicating with at least one external apparatus, which includes a television, the control method comprising the steps of:

receiving a print command and a print data from the external apparatus;

printing the print data that is received in the receiving step;

acquiring a state of the television; and controlling the printing step such that, when the print command is received in the receiving step, the printing step performs a printing of the print data in a regular mode if the state that is acquired in the acquisition step is a first state wherein the television is displaying a commercial, and the printing step performs the printing of the print data in a silent mode, which reduces a noise of an operation of the image forming apparatus when compared with the regular mode, if the state that is acquired in the acquisition step is a second state wherein the television is displaying a program other than the commercial, wherein the acquiring step acquires the state even while the printing step is printing the print data, and wherein the controlling step controls the printing step such that in the event that the state transitions from the first state to the second state while the printing step is printing the print data in the regular mode, if a page that remains to be printed is present within the print data after completion of a printing of a page that is being printed, the printing step transitions from the regular mode to the silent mode before printing the page that remains to be printed.

* * * * *